United States Patent
Ueno et al.

(10) Patent No.: US 8,729,748 B2
(45) Date of Patent: May 20, 2014

(54) SPLIT STATOR AND MANUFACTURING METHOD THEREOF

(75) Inventors: Yasuhiro Ueno, Toyota (JP); Joji Yoshimura, Toyota (JP); Koji Nakanishi, Konan (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 399 days.

(21) Appl. No.: 13/202,475

(22) PCT Filed: Jun. 5, 2009

(86) PCT No.: PCT/JP2009/060309
§ 371 (c)(1),
(2), (4) Date: Aug. 19, 2011

(87) PCT Pub. No.: WO2010/140243
PCT Pub. Date: Dec. 9, 2010

(65) Prior Publication Data
US 2012/0062051 A1 Mar. 15, 2012

(51) Int. Cl.
*H02K 1/04* (2006.01)
(52) U.S. Cl.
USPC .................................. 310/43; 310/216.005
(58) Field of Classification Search
USPC ............. 310/43, 45, 194, 216.005, 216.048, 310/216.095, 216.113, 216.129, 216.131, 310/216.137
IPC ...................... H02K 1/04,1/12, 1/14, 1/18, 3/34
See application file for complete search history.

(56) References Cited

U.S. PATENT DOCUMENTS

| 4,818,911 | A * | 4/1989 | Taguchi et al. | 310/216.105 |
| 7,012,350 | B2 * | 3/2006 | Peachee et al. | 310/166 |
| 7,122,934 | B2 * | 10/2006 | Yamamoto et al. | 310/216.105 |
| 7,642,686 | B2 * | 1/2010 | Naitou et al. | 310/216.058 |

FOREIGN PATENT DOCUMENTS

| JP | 53-079307 U | 7/1978 |
| JP | 03-074154 U | 7/1991 |
| JP | 6-153432 A | 5/1994 |
| JP | 10-151502 A | 6/1998 |
| JP | 11-341714 A | 12/1999 |
| JP | 2000-125525 A | 4/2000 |
| JP | 2000-166195 A | 6/2000 |
| JP | 2000-341888 A | 12/2000 |
| JP | 2002-272046 A | 9/2002 |
| JP | 2007-166759 A | 6/2007 |
| JP | 2008-278683 A | 11/2008 |
| JP | 2008-278685 A | 11/2008 |
| JP | 2009-089584 A | 4/2009 |

OTHER PUBLICATIONS

International Search Report of PCT/JP2009/060309 issued Sep. 1, 2009.

\* cited by examiner

*Primary Examiner* — Dang Le
(74) *Attorney, Agent, or Firm* — Kenyon & Kenyon LLP

(57) ABSTRACT

Disclosed are a split stator and a manufacturing method thereof with which insulation reliability can be improved by preventing deformation or cracking of the insulator by eliminating slippage of the insulator at the coil end face. A slip prevention mechanism that prevents slippage of the insulator is provided at the coil end face, and using insert molding, the insulator is integrally molded to a split stator core provided with the slip prevention mechanism.

11 Claims, 14 Drawing Sheets

SPLIT STATOR AND MANUFACTURING METHOD THEREOF

CROSS-REFERENCE TO RELATED APPLICATIONS

This is a 371 national phase of PCT/JP2009/060309 filed 5 Jun. 2009, the entire contents of which are incorporated herein by reference.

FIELD OF THE INVENTION

The invention relates to a split stator provided for a motor and a generator and a manufacturing method of the split stator. More specifically, the invention relates to a split stator with which an insulator is integrally formed and a manufacturing method of the stator.

BACKGROUND OF THE INVENTION

As a stator provided for a motor and a generator used in an electric vehicle, a hybrid vehicle, and the like, there is a split stator made by forming a split stator core member by stacking electromagnetic steel sheets split in a teeth unit and molding an insulator (insulation resin) integrally with the split stator core member. In this kind of the split stator, there is a possibility that cracks and deformation occur in the insulator by the thermal expansion-contraction caused under a usage environment by the difference between the linear expansion coefficients of the insulator and the split stator core member. Then, when the insulator cracked and deformation, the insulation capability of the insulator may be deteriorated, which may cause a short-circuit between the split stator core member and a coil.

Accordingly, there are contemplated various countermeasures for improving the insulation reliability by preventing the insulator from being cracked and deformed. For example, as one of the countermeasures, cracking and deformation of an insulator are prevented by improving the degree of adhesion of the insulator with a split stator core member by forming irregular shapes to side surfaces of a teeth portion of a split stator core member by stacking steel sheets having a different teeth width (Patent Document 1). Further, cracks and deformation of an insulator is prevented by improving the degree of adhesion of the insulator with a core by forming a region whose surface is roughed to a teeth corner in a green compact core molded by press molding magnetic powder (Patent Document 2).

RELATED ART DOCUMENTS

Patent Documents

Patent Document 1: JP 2007-166759 A
Patent Document 2: JP 2008-278685 A

SUMMARY OF THE INVENTION

Problems to be Solved by the Invention

However, the conventional arts have a problem in that the adhesion property between the insulator and the core cannot be improved on the coil end faces (both the end faces in an axial direction) of the stator although the degree of adhesion of the insulator with the core can be improved on the side surfaces and at the corners of the teeth portion. Therefore, the insulator is deformed in the coil end faces (the resin slip of the stator in a circumferential direction caused by the thermal expansion-contraction under the usage environment). As a result, under the usage environment, since the insulator slips on the coil end faces and the stress generated to the insulator at the time is concentrated to the teeth corners, there is a possibility that cracks are generated in the insulator and a short-circuit is generated between the split stator core member and the coil. As described above, since the conventional arts cannot reliably prevent cracks and deformation of the insulator, it is difficult to obtain a sufficient insulation reliability.

Accordingly, an object of the invention, which was made to solve the problem, is to provide a split stator and a manufacturing method thereof capable of improving insulation reliability by avoiding slip or slippage of an insulator on coil end faces and preventing cracks and deformation of the insulator.

Means of Solving the Problems

An aspect of the invention achieved to solve the problem provides a split stator including an insulator molded integrally with a split stator core made of stacked electromagnetic steel sheets, the split stator comprising: a slip prevention mechanism for preventing slip of the insulator, the slip prevention mechanism being provided on coil end faces of the split stator core, wherein the slip prevention mechanism is made of bottomed holes formed in the coil end face s, and the bottomed holes are arranged one in each of at least four corners of a teeth portion of the split stator core.

In the split stator, since the slip prevention mechanism for preventing the slip of the insulator is provided on the coil end faces of the split stator core, the slip of the insulator is eliminated on the coil end faces of the split stator core. Further, the split stator includes the split stator core formed of the electromagnetic steel sheets that are stacked and thus irregularities are formed on the side surfaces of the split stator core by the stacked electromagnetic steel sheets. Accordingly, the degree of adhesion between the side surfaces of the split stator core and the insulator is high.

Therefore, according to the above split stator, the slip of the insulator caused by the thermal expansion-contraction under a usage environment can be prevented on the coil end faces and the side surfaces of the split stator core. With this configuration, the insulator is prevented from being deformed which results in that the stress acting on the insulator is avoided from concentrating on a teeth corner. Accordingly, since there is not a possibility that deformation and cracks are generated in the insulator, a short-circuit between the split stator core and a coil is reliably prevented and thus insulation reliability is improved.

The slip prevention mechanism is made of the bottomed holes formed in the coil end faces. Accordingly, the slip prevention mechanism can be easily realized and the slip of the insulator can be reliably prevented by an anchor effect caused by the bottomed holes. Further, the reduction of metal amount of the split stator core caused by the provision of the slip prevention mechanism can be suppressed. Thus, the deterioration of electromagnetic performance of the split stator can be minimized.

In the above split stator, preferably, the bottomed holes arranged at the four corners are placed within 5 mm from edges of each coil end face of the teeth portion.

This is because when the bottomed holes are arranged in positions 5 mm or more apart from the edges of the teeth portion, it is impossible to efficiently prevent the slip of the insulator in the vicinity of the corners of the teeth portion by the anchor effect of the bottomed holes.

Further, it is preferable that each bottomed hole include a large diameter portion having a diameter larger than a diameter of the hole on the coil end faces.

By such shape of the bottomed holes, the anchor effect can be enhanced, thereby more reliably preventing the slip of the insulator.

Then, it is preferable that the bottomed holes are formed of through holes previously provided in the electromagnetic steel sheets.

With this configuration, the bottomed holes can be formed on the coil end faces without performing a drilling process after the split stator core is completed. The through holes may be formed when the electromagnetic steel sheets are punched. Specifically, the through holes can be easily formed by use of punch pins of a press device. Accordingly, the slip prevention mechanism can be provided on the coil end faces without lowering a production efficiency and without increasing a production cost.

Here, the depth of the bottomed holes can be arbitrarily set in a unit of thickness of the electromagnetic steel sheets depending on the number of stacked electromagnetic steel sheets in which the through holes are formed. Then, the bottomed holes having the large diameter portion can be easily configured by changing the diameter of the through holes formed in the electromagnetic steel sheets. Accordingly, bottomed holes can be formed without lowering the production efficiency and without increasing the production cost even if the bottomed holes have a complex shape for enhancing the anchor effect.

Further, in the above split stator, the slip prevention mechanism may include recesses formed by a dimple process to the coil end faces.

With this configuration, irregularities as well as the bottomed holes are formed on processed surfaces, that is, the coil end faces. Thus, a larger anchor effect can be obtained and the slip of the insulator can be more reliably prevented.

Further, in the split stator described above, the slip prevention mechanism may include rough surface regions formed by a shot blast process using a non-metal high thermal conductive filler to the coil end faces.

With this configuration, the slip of the insulator can be more reliably prevented because the roughed surface regions as well as the bottomed holes are formed on the processed surfaces, that is, on the coil end faces.

Here, in the shot blast process, since the non-metal high thermal conductive filler is used without using metal, even if the filler is adhered to the split stator core by the shot blast process, the insulation performance is not deteriorated. Further, the heat radiation property of the split stator core can be also improved by the adhered filler.

Then, the split stator may be manufactured as described below. That is, the invention provides a manufacturing method of a split stator including an insulator molded integrally with a split stator core made of stacked electromagnetic steel sheets, the method comprising: providing bottomed holes as a slip prevention mechanism for preventing slip of the insulator on a coil end face of the split stator core by stacking electromagnetic steel sheets formed with through holes and electromagnetic steel sheets formed with no through holes in press molding of the electromagnetic steel sheets, the bottomed holes being arranged one in each of at least four corners of a teeth portion of the split stator core; and integrally molding the insulator with the split stator core by insert molding.

According to the manufacturing method, the split stator in which the insulation reliability is improved can be obtained by preventing the generation of deformation and cracks by eliminating the slip of the insulator to the split stator core.

Specifically, the method may include that the bottomed holes arranged at the four corners are placed within 5 mm from edges of each coil end face of the teeth portion.

With this configuration, the slip prevention mechanism can be provided on the coil end faces without lowering the production efficiency and without increasing the production cost. This can prevent the generation of deformation and cracks by eliminating the slip of the insulator to the split stator core. Therefore, the split stator with improved insulation reliability can be obtained.

And, preferably, the method includes forming a large diameter portion in each bottomed hole by changing the diameter of the through holes to be formed in the electromagnetic steel sheets, the large diameter portion having a diameter larger than that of the holes on the coil end faces.

With this configuration, the bottomed holes can be formed easily without lowering the production efficiency and without increasing the production cost even if the bottomed holes have the complex shape for enhancing the anchor effect.

Further, the above manufacturing method of the split stator may include performing a dimple process to the coil end faces to form the slip prevention mechanism.

Otherwise, the manufacturing method of the split stator may include performing a shot blast process using high thermal conductive filler to the coil end faces to form rough surface regions as the slip prevention mechanism.

Also with this configuration, a larger anchor effect can be obtained and thus the slip of the insulator to the split stator core can be more reliably prevented. This can prevent the occurrence of deformation and cracks in the insulator. Thereby the split stator with enhanced insulation reliability can be achieved.

Effects of the Invention

According to the split stator and the manufacturing method thereof according to the invention, as described above, the insulator can be prevented from slipping on the coil end faces. This can prevent deformation and cracking of the insulator and hence achieve improved insulation reliability.

DETAILED DESCRIPTION

Preferable embodiments for embodying a split stator and a manufacturing method thereof according to the invention will be described in detail with reference to the accompanying drawings.

First Embodiment

Figure 1:
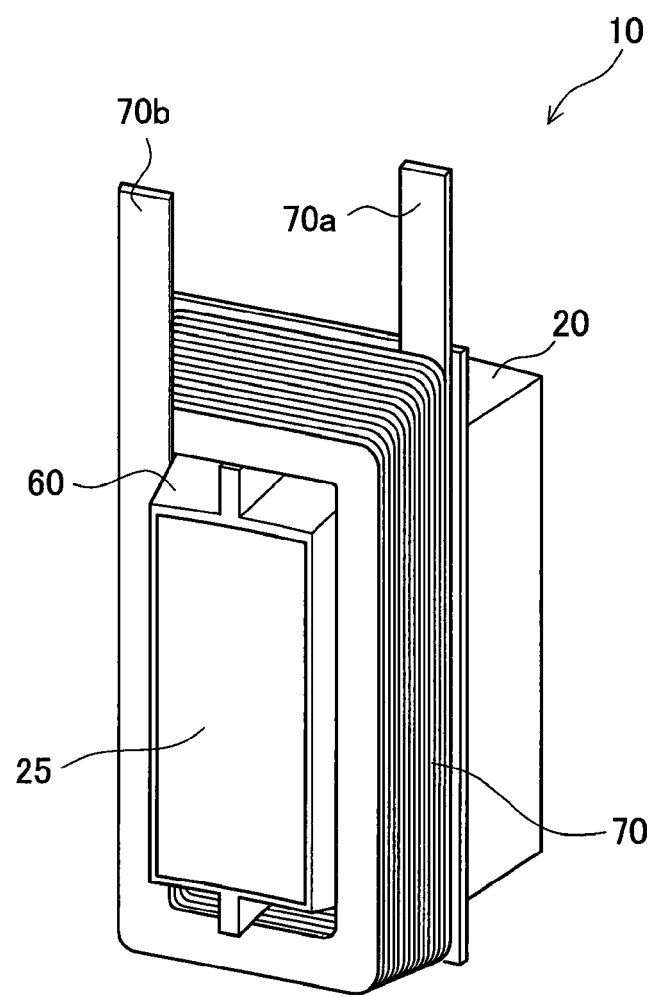
FIG. 1 is a perspective view showing a schematic configuration of a split stator member in a first embodiment.
Figure 2:
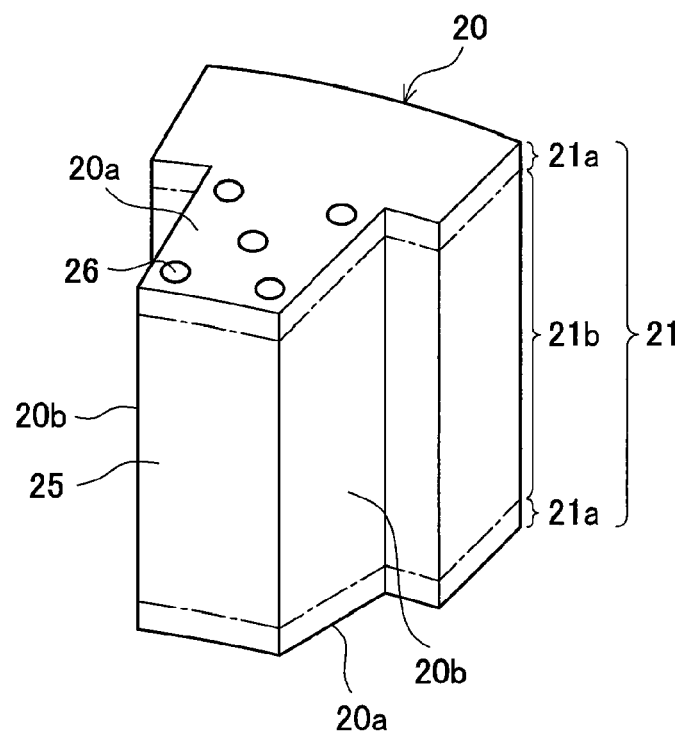
FIG. 2 is a perspective view showing a schematic configuration of a split stator core member.
Figure 3:
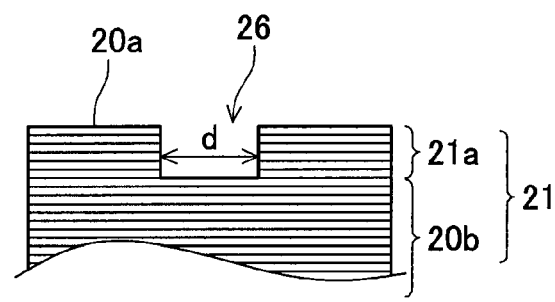
FIG. 3 is an enlarged sectional view of a part of the split stator core member in the vicinity of a bottomed hole.
Figure 4:
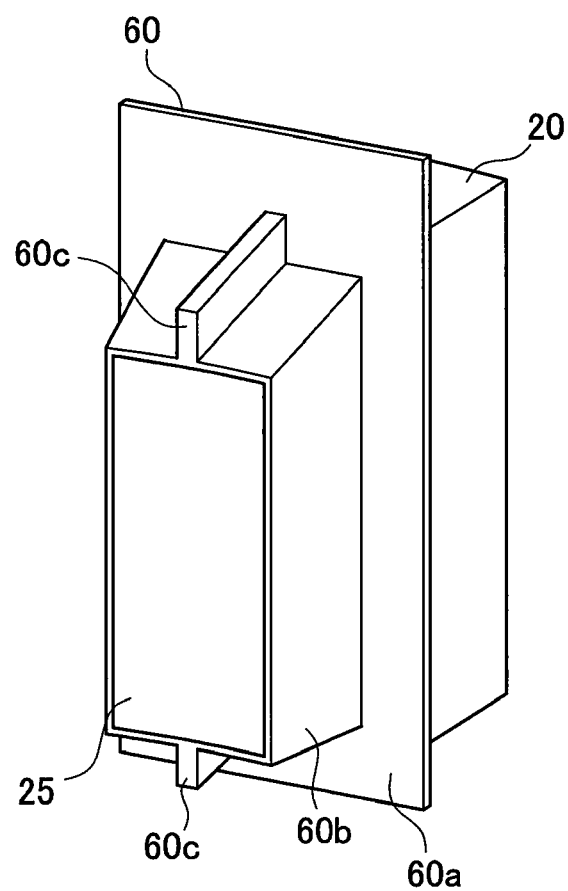
FIG. 4 is a perspective view showing a schematic configuration of an insulator molded to the split stator core member.
Figure 5:
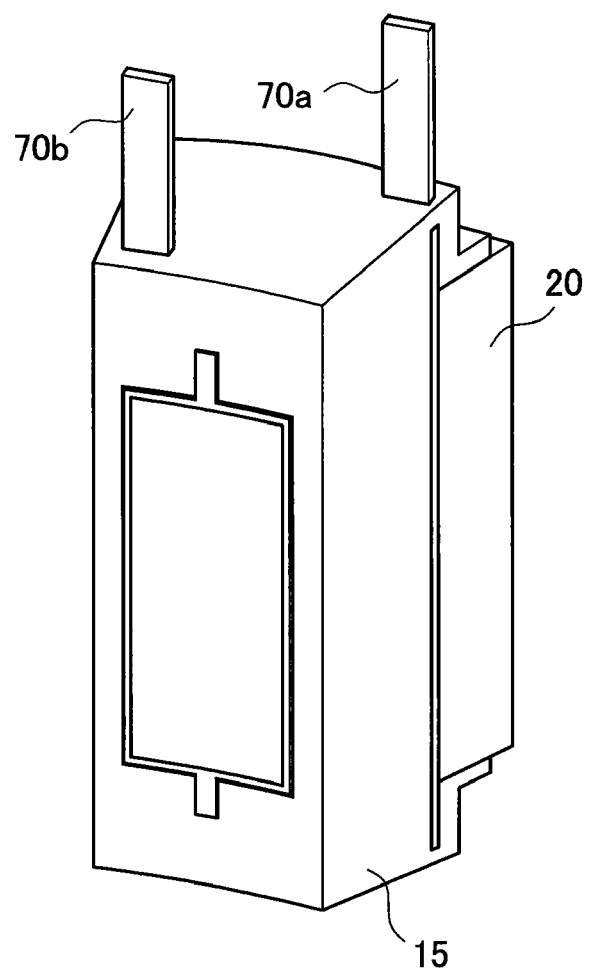
FIG. 5 is a perspective view showing the split stator member covered with molding resin.
Figure 6:
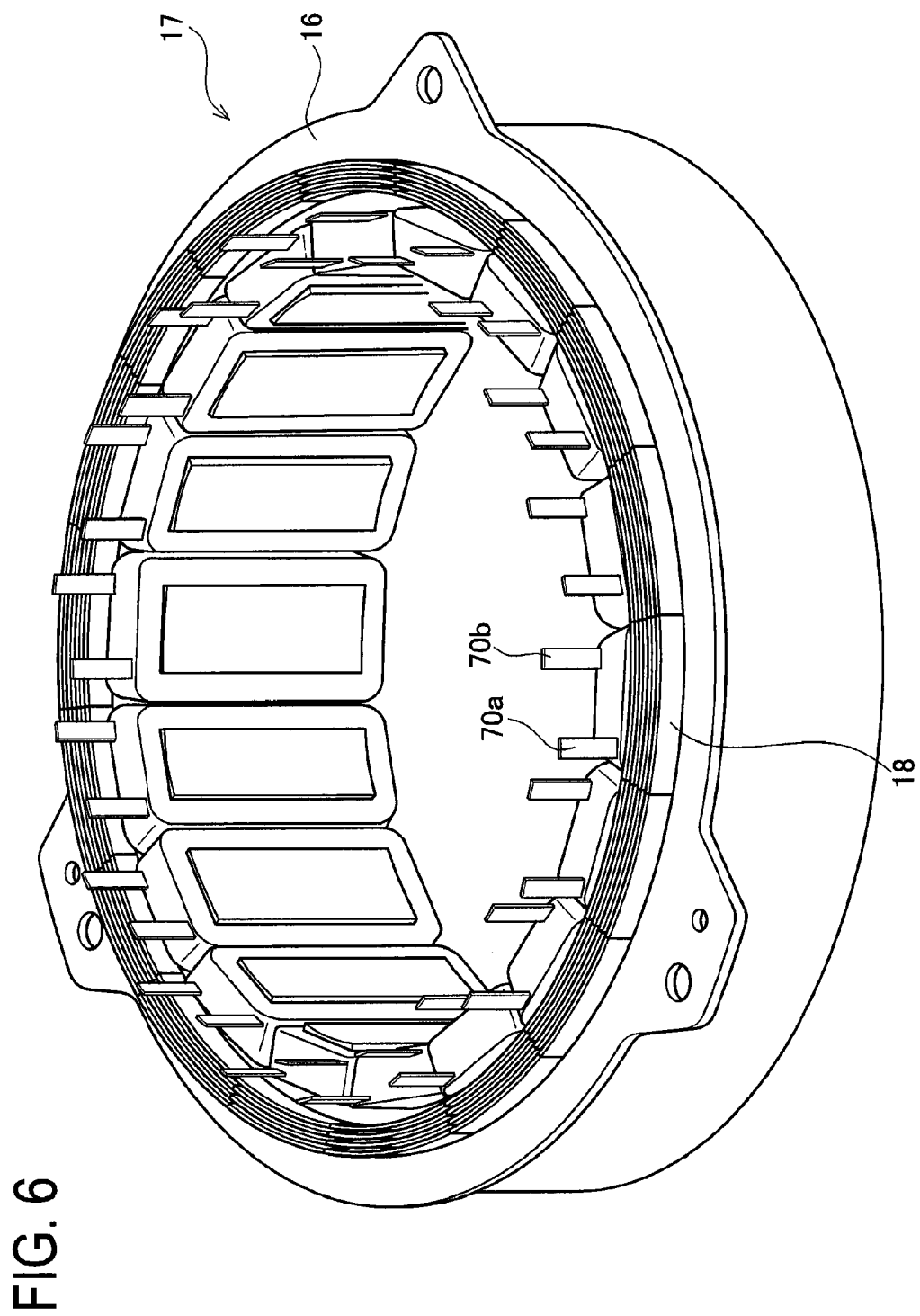
FIG. 6 is a perspective view showing an annular stator configured by combining split stator members.

First, a first embodiment will be described. A split stator of the first embodiment will be briefly described with reference to FIGS. 1 to 6. FIG. 1 is a perspective view showing a schematic configuration of the split stator member according to the first embodiment. FIG. 2 is a perspective view showing a schematic configuration of a split stator core member. FIG. 3 is an enlarged sectional view of a part of the split stator core member in the vicinity of a bottomed hole. FIG. 4 is a perspective view showing a schematic configuration of an insulator molded to the split stator core member. FIG. 5 is a perspective view showing the split stator member covered with molding resin. FIG. 6 is a perspective view showing an annular stator configured by combining split stator members.

As shown in FIG. 1, a split stator member 10 includes a split stator core member 20, an insulator 60, and an edgewise coil 70. Then, the insulator 60 is resin molded (integrally molded) with the core member 20, and the edgewise coil 70 is attached to the core member 20 via the insulator 60.

As shown in FIG. 2, the core member 20 is configured by stacking electromagnetic steel sheets 21 (in detail, electromagnetic steel sheets 21a, 21b) which are made by being press punched in a teeth unit. Note that the electromagnetic steel sheets 21a, 21b will be described in detail later. The core member 20 is formed with a teeth portion 25 to which the molded edgewise coil 70 is attached. An annular stator core is configured by combining 18 pieces of core members 20 such as to be adjacent to each other (refer to FIG. 6).

Then, a plurality of bottomed holes 26 are formed to extend in an axial direction in the coil end faces (both the end faces in the axial direction) 20a in the teeth portion 25 of the core member 20. The bottomed holes 26 are an example of a "slip prevention mechanism" in the invention. Note that irregularities are formed on the coil side surfaces 20b in the teeth portion 25 of the core member 20 by stacking the electromagnetic steel sheets 21

The bottomed holes 26 may be formed at least one in each of the four corners of the teeth portion 25, that is, four bottomed holes 26 are formed in total. Thus, this configuration prevents slip of the insulator 60. Note that, in the present embodiment, total five bottomed holes 26 are provided; four in the four corners of the teeth portion 25 individually and one in the central portion of the teeth portion 25.

Figure 7:
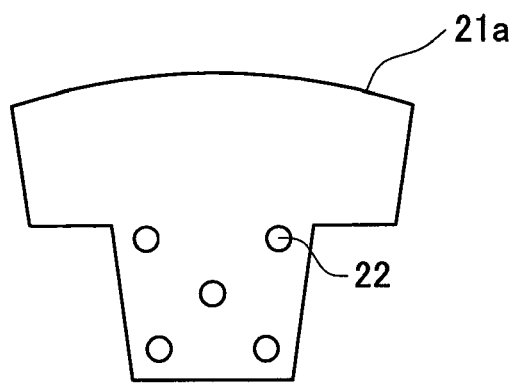
FIG. 7 is a plan view showing an electromagnetic steel sheet in which through holes are formed.

The bottomed holes 26 are made of through holes 22 which are formed (punched) by a press at the same time the electromagnetic steel sheets 21 are made by being press punched (refer to FIG. 7). That is, as shown in FIG. 3, the bottomed holes 26 are configured by stacking the plurality of electromagnetic steel sheets 21a having the through holes 22 formed on the coil end faces 20a sides (refer to FIG. 7). Note that a part of the teeth portion 25 in which no through holes 22 are formed is made of the stacked ordinary electromagnetic steel sheets 21b formed with no bottomed holes 26 (refer to FIG. 8).

Note that, although the bottomed holes 26 can be provided by a machining process, an additional step is needed. Thus, such machining process lowers a production efficiency and increases a production cost. Further, it is very difficult that the machine processing defines the bottomed holes having a complex shape as described later as a modification of the embodiment.

Here, the bottomed holes 26 provided on the coil end faces 20a may have a hole diameter d of about 0.5 to 3.0 mm$\phi$ and a hole depth of about 0.5 to 10 mm. With the provision of these bottomed holes 26, the anchor effect caused by the bottomed holes 26 can effectively prevent the slip of the insulator 60. Then, in this embodiment, since the bottomed holes 26 are made of the through holes 22 of the electromagnetic steel sheets 21a, the hole diameter can be easily changed by changing the diameter of the through holes 22 formed in the electromagnetic steel sheets 21a, and the hole depth can be easily changed by changing the number of the stacked electromagnetic steel sheets 21a formed with the through holes 22. That is, the bottomed holes having various diameters and depths can be easily formed on the coil end faces 20a. Note that the diameter and depth of the bottomed holes 26 may be determined to an optimum hole diameter and a hole depth in the above range by an experiment and the like so that a sufficient anchor effect can be obtained as well as the metal amount of the core member 20 is reduced and suppressed to a minimum amount by the respective stator members having a different specification such as size.

Further, the bottomed holes 26 are preferably arranged within 5 mm from the edges of the teeth portion 25. This is because when the bottomed holes 26 are provided at positions 5 mm or more away from the edges of the teeth portion 25, the slip of the insulator 60 in the vicinity of the corners of the teeth portion 25 cannot be effectively prevented by the anchor effect of the bottomed holes 26. In contrast, when the bottomed holes 26 are arranged near to the edges of the teeth portion 25, it becomes difficult to process the bottomed holes 26 (the through holes 22). Thus, the bottomed holes 26 are preferably arranged at positions about 2 to 3 mm away from the edges of the teeth portion 25.

The insulator 60 is used to secure the insulation between the core member 20 and the edgewise coil 70. As shown in FIG. 4, the insulator 60 includes a cylindrical portion 60b covering the teeth portion 25 of the core member 20, a cover portion 60a covering an inner surface portion except the portion from which the teeth portion 25 projects and extends in an up and down direction, and two projections 60c projecting upward and downward of the cylindrical portion 60b. Note that the side surfaces of the insulator 60 have a thickness of about 0.2 to 0.3 mm.

The edgewise coil 70 is obtained by forming a flat wire having a rectangular cross section such that the inside diameter of the edgewise coil 70 is in conformity with the shape of the teeth portion 25. As shown in FIG. 1, the edgewise coil 70 is in close contact with the core member 20 via the cover portion 60a of the insulator 60. Further, the edgewise coil 70 is positioned by the teeth portion 25 in a left and right direction via the cylindrical portion 60b of the insulator 60 and positioned by the projections 60c of the insulator 60 in the up and down direction. With this configuration, the edgewise coil 70 is positioned at a fixed position to the core member 20. Then, the edgewise coil 70 includes a long terminal 70a which projects upward in the vicinity of the cover portion 60a of the insulator 60 and a long terminal 70b which projects upward in the vicinity of the tip end of the teeth portion 25 for the electrical connection to the other coil and the like.

Then, as shown in FIG. 5, the thus configured stator member 10 is formed with a resin mold 15 only in the portion surrounding the coil portion of the edgewise coil 70. Then, as shown in FIG. 6, the 18 pieces of the stator members 10 are annularly combined, and an outer ring 16 which is heated and has an externally expanded inner diameter is attached to the combined stator members 10. Thereafter, the outer ring 16 is cooled to a room temperature and the inner diameter of the outer ring 16 is contracted. Accordingly, the 18 pieces of the stator members 10 are close fit and integrated with each other, thus forming the annular stator 17. Then, the long terminal 70a of each stator member 10 is connected to the long terminal 70b of a third stator member 10 by skipping two stator members on a left side via a bus bar in a bus bar holder 18. As described above, 18 pieces of the long terminals are sequentially connected by the bus bars, so that three motor coils having U, V, and W phases respectively are configured.

Figure 8:
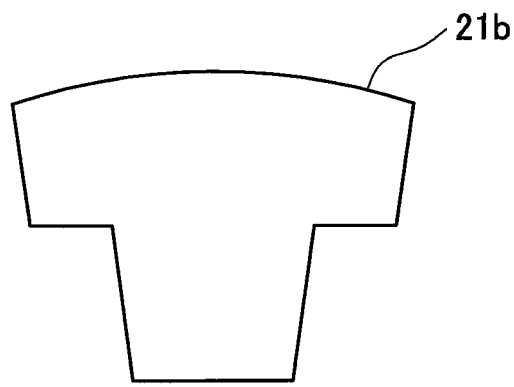
FIG. 8 is a plan view showing an electromagnetic steel sheet in which no through holes are formed.
Figure 9:
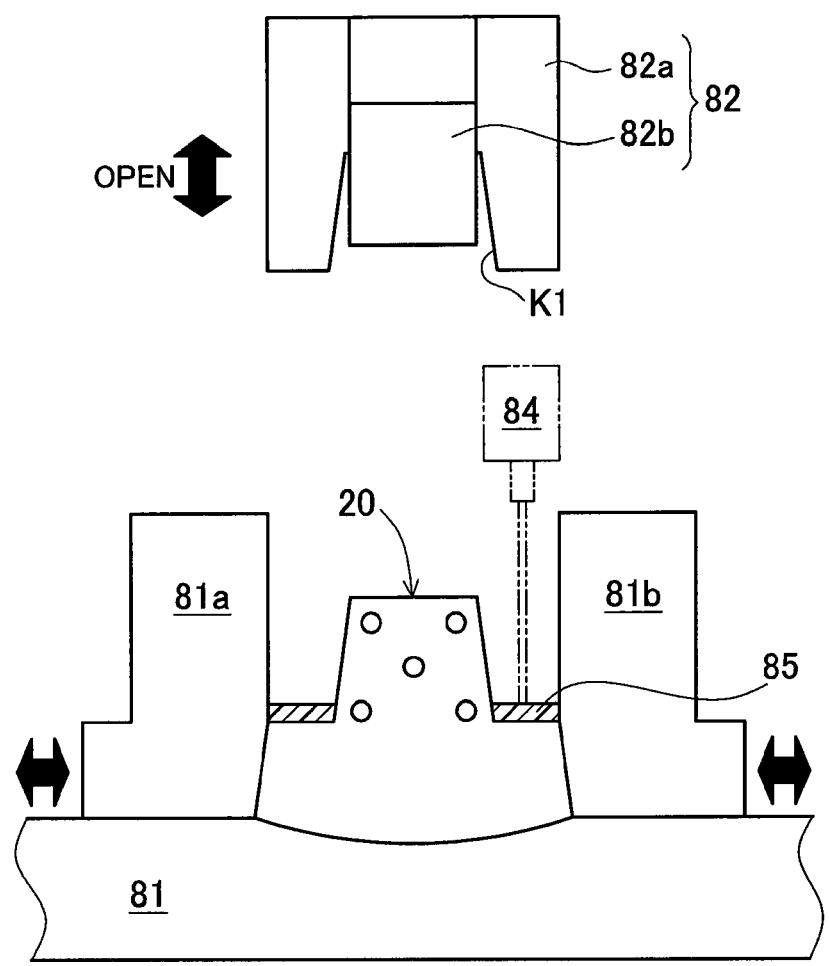
FIG. 9 is a view showing a structure of a molding metal mold for molding the insulator.
Figure 10:
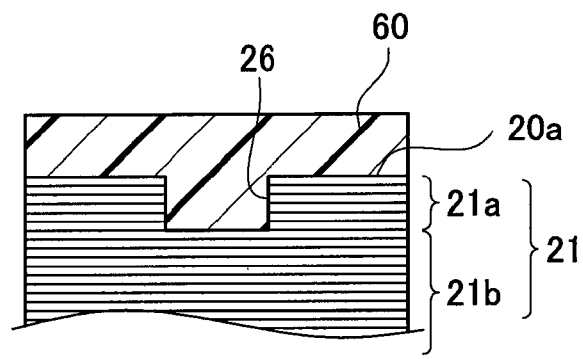
FIG. 10 is an enlarged sectional view of a part of the split stator member in the vicinity of the bottomed hole.

Next, a manufacturing method of the stator member 10 will be described with reference also to FIGS. 7 to 10 in addition to the above drawings. FIG. 7 is a plan view showing an electromagnetic steel sheet in which the through holes are formed. FIG. 8 is a plan view showing an electromagnetic steel sheet (ordinary electromagnetic steel sheet) in which no through holes are formed. FIG. 9 is a view showing a structure of a molding metal mold for molding the insulator. FIG. 10 is an enlarged sectional view of a part of the stator member in the vicinity of the bottomed hole.

First, the electromagnetic steel sheets 21a, 21b are prepared. That is, the electromagnetic steel sheets 21a, 21b molded in the teeth unit is manufactured by press punching. Here, when the electromagnetic steel sheet 21a is to be manufactured, a press device is operated to stamp an electromagnetic steel sheet into a predetermined shape and simultaneously project punching pins outward from a press surface, thereby forming the through holes 22 (five through holes in this embodiment). Therefore, the production efficiency of the electromagnetic steel sheets is not lowered and the production cost of the electromagnetic steel sheets is not increased by providing the through holes 22. The electromagnetic steel sheet 21a formed with the through holes 22 is completed as shown in FIG. 7 by performing the press molding as described above. In contrast, when the press device is operated to stamp an electromagnetic steel sheet into a predetermined shape but not to project the punching pins from the press surface and, the ordinary electromagnetic steel sheet 21b with no through holes 22 is completed as shown in FIG. 8.

Then, the core member 20 is configured by stacking the electromagnetic steel sheets 21a, 21b manufactured by the press punching. Specifically, first, the electromagnetic steel sheets 21a are stacked, next, the electromagnetic steel sheets 21b are stacked, and finally the electromagnetic steel sheets 21a are stacked again. With this configuration, as shown in FIG. 3, the bottomed holes 26 are formed on both the coil end faces 20a by the stacked electromagnetic steel sheets 21a. At the time, the number of the electromagnetic steel sheets 21a stacked for both the coil end faces 20a is determined by the depth of the bottomed holes 26 formed in the coil end faces 20a. Thus, as shown in FIG. 2, the core member 20 having the plurality of bottomed holes 26 formed in the coil end faces 20a is completed.

Note that, in the embodiment, the core member 20 is produced by punching the electromagnetic steel sheets 21a, 21b and sequentially stacking the punched electromagnetic steel sheets. With this configuration, the production efficiency of the core member 20 and thus the production efficiency of the stator member 10 are improved.

Subsequently, the insulator 60 is insert molded to the core member 20 manufactured as described above. The insulator 60 is molded by the following procedure. That is, as shown in FIG. 9, first, the core member 20 is placed in the molding metal mold in a state that lower mold slide cores 81a, 81b of a lower mold 81 are opened to left and right. The lower mold slide cores 81a, 81b are closed inward to thereby position and hold the core member 20 from left and right. Here, the core member 20 is previously heated. Next, while an upper mold 82 is in an open state, an injection device 84 is moved around the teeth portion 25 once. An epoxy high thermal conductive material which is an insulator material 85 is injected into a cavity K1. When the injection is finished, the injection device 84 is retracted. Note that FIG. 9 shows the state that the insulator material 85 is injected.

Next, the upper mold 82 is moved downward, and an upper slide core 82b comes into contact with the tip end of the teeth portion 25. In this state, the cavity K1 is defined by the core member 20, the lower mold slide cores 81a, 81b, a guide mold 82a, and the upper slide core 82b. Then, the guide mold 82a is further moved downward to form a cavity for forming the insulator 60. With this configuration, the insulator material 85 is molded in the shape of the insulator 60 shown in FIG. 4. At this time, the insulator material 85 is also filled in the bottomed holes 26 formed in the coil end faces 20a. Thereafter, it is waited that the insulator material 85 is solidified and then the upper mold 82 is moved upward, and the lower mold slide cores 81a, 81b are opened to left and right. Then, when the core member 20 on which the insulator 60 is insert molded is taken out from the molding metal mold, the core member 20 including the insulator 60 shown in FIG. 4 can be obtained.

Further, although the epoxy resin (thermosetting resin) is exemplified above as the insulator material 85, the insulator material 85 is not limited thereto and a thermoplastic resin may also be used. In this case, the cavity K1 for forming the insulator 60 may be formed by injection molding the thermoplastic resin at the stage in which the cavity K1 is configured, and moving the guide mold 82a downward immediately after the configuration of the cavity. With this configuration, the thermoplastic resin (insulator material) can be molded in the shape of the insulator 60 shown in FIG. 4. Therefore, a molding cycle can be greatly shortened.

Thereafter, the edgewise coil 70 is attached to the core member 20, thereby the stator member 10 is completed. That is, the stator member 10 shown in FIG. 1 can be obtained by fitting the edgewise coil 70 to the teeth portion 25 of the core member 20 to which the insulator 60 is resin molded via the cover portion 60a of the insulator 60.

Then, in the stator member 10 manufactured as described above, as shown in FIG. 10, a part of the resin molded insulator 60 enters the bottomed hole 26 on the coil end face 20a. Therefore, the degree of adhesion of each coil end face 20a of the core member 20 with the insulator 60 is improved by the anchor effect caused by the bottomed hole 26. Further, the core member 20 consists of the stacked electromagnetic steel sheets 21a, 21b and accordingly irregularities are formed on the coil side surfaces 20b of the core member 20 by the stacked electromagnetic steel sheets. This provides a high degree of adhesion between the coil side surfaces 20b and the insulator 60.

Therefore, according to the stator member 10, it is possible to prevent the slip of the insulator 60 caused by thermal expansion-contraction under a usage environment on the coil end faces 20a and on the coil side surfaces 20b of the core member 20. This can prevent the insulator 60 from being deformed and reliably avoid the stress acting on the insulator 60 can be reliably from concentrating on the corners (the portions where the coil end faces 20a are in contact with the coil side surfaces 20b) of the teeth portion 25. Accordingly, in the stator member 10, there is no possibility that cracks are generated in the insulator 60, thereby reliably preventing a short-circuit between the core member 20 and the edgewise coil 70. That is, in the stator member 10, insulation reliability is improved without lowering the production efficiency and without increasing the production cost.

Figure 11:
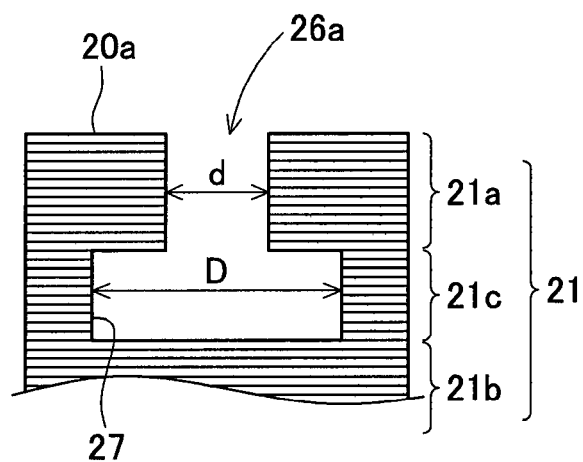
FIG. 11 is a view showing the shape of a bottomed hole in a first modification.
Figure 12:
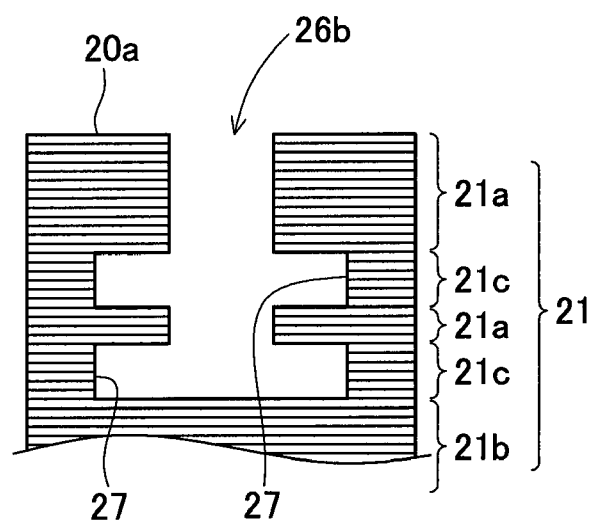
FIG. 12 is a view showing the shape of a bottomed hole in a second modification.
Figure 13:
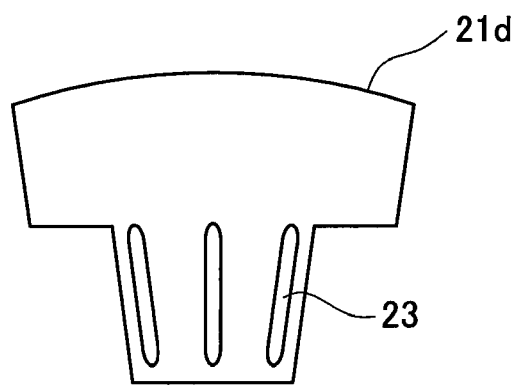
FIG. 13 is a view showing the shape of a bottomed hole (a through hole of an electromagnetic steel sheet) in a third modification.

Here, modifications in the first embodiment will be described with reference to FIGS. 11 to 13. FIG. 11 is a view showing the shape of a bottomed hole in a first modification. FIG. 12 is a view showing the shape of a bottomed hole in a second modification. FIG. 13 is a view showing the shape of a bottomed hole (a through hole of an electromagnetic steel sheet) in a third modification.

First, the first modification will be described. In the first modification, as shown in FIG. 11, in place of the bottomed holes 26, a bottomed hole 26a including a large diameter portion 27 is formed. The large diameter portion 27 has a diameter (D) larger than a diameter (d) of the hole opening on the coil end faces 20a (D>d). The large diameter portion 27 of the bottomed hole 26a is made of electromagnetic steel sheets 21c formed with through holes having the diameter D. The bottomed holes 26a each having a complex shape including the large diameter portion 27 can be easily formed in the coil end face 20a by changing the diameters of the through holes formed in the electromagnetic steel sheets as described above. The diameter D may be set about twice the diameter d.

Then, according to the first modification, the insulator 60 can be prevented from floating or separating from the coil end faces 20a. Accordingly, it is effective to apply the first modification when the core member is large in an axial direction (for example, 50 mm or more) and the insulator 60 has a large floating amount. Note that, in this case, although the volume of the bottomed hole becomes large and the reduction amount of a metal in the core member increases, this hardly gives an influence on an electromagnetic performance because the core member itself is increased in the size.

Next, the second modification will be described. In the second modification, as shown in FIG. 12, a bottomed hole 26b is formed with a plurality of large diameter portions 27 (here, 2 portions). The large diameter portions 27 in the bottomed hole 26b are also made of the electromagnetic steel sheets 21c each formed with through holes having the diameter D. As described above, the complex-shaped bottomed holes 26b each having the plurality of large diameter portions 27 can be formed in the coil end faces 20a easily (that is, without lowering the production efficiency and without increasing the production cost) by changing the stacking sequence of the electromagnetic steel sheets 21a, 21b, and 21c.

Then, according to the second modification, the anchor effect can be enhanced more than the first modification and thus the insulator 60 can be more effectively prevented from floating from the coil end faces 20a.

Finally, the third modification will be described. In the third modification, the through hole provided to electromagnetic steel sheets are changed from a round hole shape to a slot-like shape. That is, as shown in FIG. 13, slot-like bottomed holes are provided to the coil end faces using an electromagnetic steel sheet 21d having slot-like through holes 23. Also in this case, the slot-like bottomed holes can be formed in the coil end faces only by changing the shape of the through holes in the electromagnetic steel sheets. That is, even if the slot-like bottomed holes are formed in the coil end faces, the production efficiency is not lowered and the production cost is not increased.

Note that the slot-like bottomed holes may have a hole width of about 0.5 to 3.0 mm, a hole length of about 5 to 20 mm and a hole depth of about 0.5 to 10 mm and be arranged within about 5 mm or less from the edges of the teeth portion 25.

Then, according to the third modification, the anchor effect can be obtained in wide ranges of the coil end faces 20a. As a result, the stress acting on the insulator 60 in the overall corners of the teeth portion 25 can be eased. It is effective to apply the third modification to a stator member used to a large type-high output motor which cannot secure the insulation capability of the insulator 60 by the bottomed hole 26 described above. Note that, also in this case, although the volume of the bottomed hole becomes large and the reduction amount of the metal in the core member increases, this hardly gives an influence on the electromagnetic performance because the core member itself is increased in size.

As described above in detail, according to the stator member 10 in the first embodiment, the electromagnetic steel sheets 21a formed with the through holes 22 and the ordinary electromagnetic steel sheets 21b are stacked so that the bottomed holes 26 are provided on both the coil end faces 20a. Thus, the slip of the insulator 60 on the coil end faces 20a can be prevented by the anchor effect of the bottomed holes 26. This can prevent the insulator 60 from being deformed and avoid the stress acting on the insulator 60 from concentrating on the corners of the teeth portion 25. This configuration can reliably prevent generation of cracks in the insulator 60, thereby reliably preventing a short-circuit between the core member 20 and the edgewise coil 70.

Then, when the stator member 10 is manufactured, since the bottomed holes 26 formed in the coil end faces 20a are configured by stacking the electromagnetic steel sheets 21a formed with the through holes 22, the production efficiency is not lowered and the production cost is not increased by providing the bottomed holes 26. Accordingly, the stator member 10 having the high insulation reliability can be manufactured without lowering the production efficiency and without increasing the production cost.

Second Embodiment

Next, a second embodiment will be described. In the second embodiment, recesses formed by a dimple process are formed in coil end faces as the slip prevention mechanism in place of the bottomed holes 26 in the first embodiment. Accordingly, a structure and a manufacturing method of the split stator member of the second embodiment are somewhat different from those of the first, embodiment. Thus, a point different from the first embodiment will be mainly described below. Note that the configurations common to those of the first embodiment are denoted by the same reference numerals in the drawings and the description of the configurations is appropriately omitted.

Figure 14:
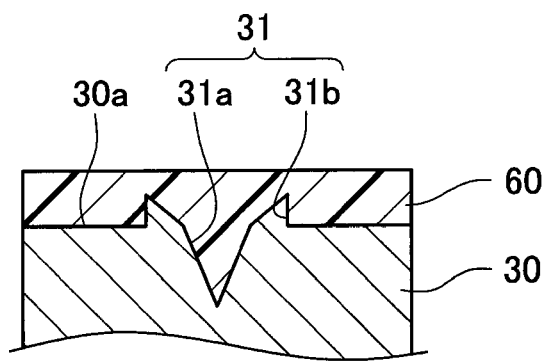
FIG. 14 is a sectional view showing a part of a split stator member in a second embodiment and is an enlarged sectional view showing a recess formed in a coil end face and its surroundings.
Figure 15:
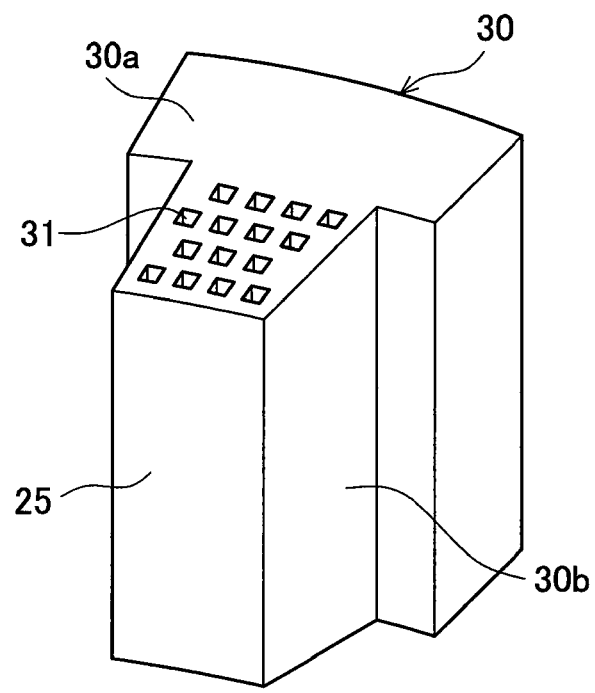
FIG. 15 is a perspective view showing a schematic configuration of a split stator core member.

First, a stator member according to the second embodiment will be described with reference to FIGS. 14 and 15. FIG. 14 is a sectional view showing a part of the stator member according to the second embodiment and is an enlarged sectional view showing a recess formed in a coil end face and its surroundings. FIG. 15 is a perspective view showing a schematic configuration of a split stator core member.

As shown in FIG. 14, in the stator member in the second embodiment, a recess 31 is formed in a coil end face 30a of a teeth portion 25 of a split stator core member 30. The recess 31 is formed by the dimple process to include a concave portion 31a and a convex portion 31b formed around the concave portion 31a. A reason why the convex portion 31b is formed around the concave portion 31a as described above resides in that, a part of an electromagnetic steel sheet 21b is not removed in the dimple process and, when the concave portion 31a is formed, the metal of the portion formed with the concave portion 31a escapes to the outside of the concave portion 31a and swells on the coil end face 30a. Note that the core member 30 is configured by stacking the electromagnetic steel sheets 21b shown in FIG. 8.

Then, as shown in FIG. 15, a large number of the recesses 31 each having the concave portion 31a and the convex portion 31b are provided on both the coil end faces 30a in the teeth portion 25 of the core member 30. Accordingly, irregularities are formed in both the coil end faces 30a by the concave portions 31a and the convex portions 31b of the recesses 31. With this configuration, a large anchor effect can be obtained in the coil end faces 30a.

Here, the recesses 31 formed in the coil end faces 30a may have a concave portion longitudinal (radial direction) size of about 0.3 to 2.0 mm, a concave portion lateral (circumferential direction) size of about 0.3 to 2.0 mm, a concave portion depth of 0.02 to 2.0 mm, and an inter-concave portion distance of 5 mm or less. The anchor effect provided by the recesses 30 can effectively prevent an insulator 60 from slipping. Note that, in this embodiment, although the concave portion 31a has an opening of a rectangular shape, the shape of the opening is not limited to this and may have any shape.

Figure 16A:
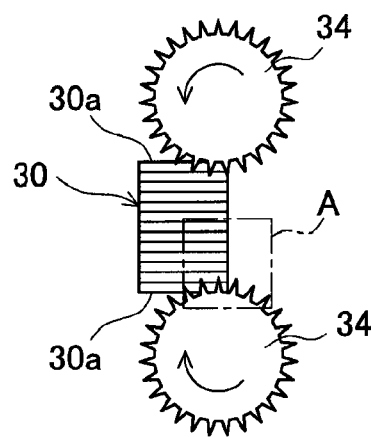
FIG. 16A is a view showing a state in which a dimple process is performed.
Figure 16B:
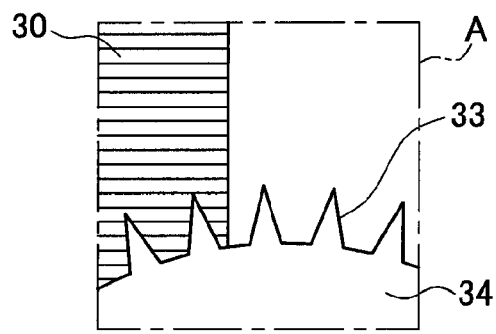
FIG. 16B is an enlarged view of a part A in FIG. 16B.

Next, the manufacturing method of the split stator according to the second embodiment will be described with reference to FIGS. 16A and 16B in addition to the drawings described above. FIGS. 16A and 16B are views showing states in which the dimple process is performed.

First, electromagnetic steel sheets 21b molded in the teeth unit by press punch are manufactured. Then, the core member 30 is configured by stacking the electromagnetic steel sheets 21b. Note that, also in this embodiment, the production efficiency is improved by configuring the core member 30 by punching the electromagnetic steel sheets 21b and sequentially stacking the punched electromagnetic steel sheets.

Subsequently, as shown in FIGS. 16A and 16B, the dimple process is performed by pressing a pair of rollers 34 to which projections 33 for the dimple process is formed on both the coil end faces 30a of the core member 30. As shown in FIG. 15, the core member 30 formed with a lot of the recesses 31 on both the coil end faces 30a is completed by the dimple process. Note that, although it is sufficient to perform the dimple process only to a part of each coil end face 30a of the teeth portion 25 with which the insulator 60 is molded integrally, the dimple process may be performed on the whole area of each coil end face 30a.

Thereafter, likewise the first embodiment, the stator member is completed by insert molding the insulator 60 to the core member 30 to which the dimple process is performed and attaching an edgewise coil 70 thereto (refer to FIG. 1).

Then, in the stator member according to the second embodiment manufactured as described above, in each coil end face 30a, a part of the resin molded insulator 60 enters the lot of the recesses 31 formed by the dimple process as shown in FIG. 14. Therefore, a large anchor effect can be obtained by the irregularities of the recesses 31. As a result, according to the stator member according to the second embodiment, the slip of the insulator 60 caused by the thermal expansion-contraction under the usage environment can be prevented on the coil end faces 30a of the core member 30. Further, the slip of the insulator 60 on coil side surfaces 30b can also be prevented likewise the first embodiment. As a result, the insulator 60 is prevented from being deformed and the stress acting on the insulator 60 can be reliably avoided from concentrating on the corners of the teeth portion 25. As a result, in the stator member according to the second embodiment, there is no possibility that cracks are generated in the insulator 60. Thus, a short-circuit between the core member 30 and the edgewise coil 70 is reliably prevented.

Here, when the dimple process is performed to the coil end faces 30a as described above, the core member 30 is sequentially pressed by the roller 34 from one edge to the other edge. Consequently, there is a possibility that the coil end faces 30a are unevenly pressed by the roller 34 and thus there is a possibility that the core member 30 is deformed. Further, it is also necessary to newly provide a dimple process step.

Figure 17:
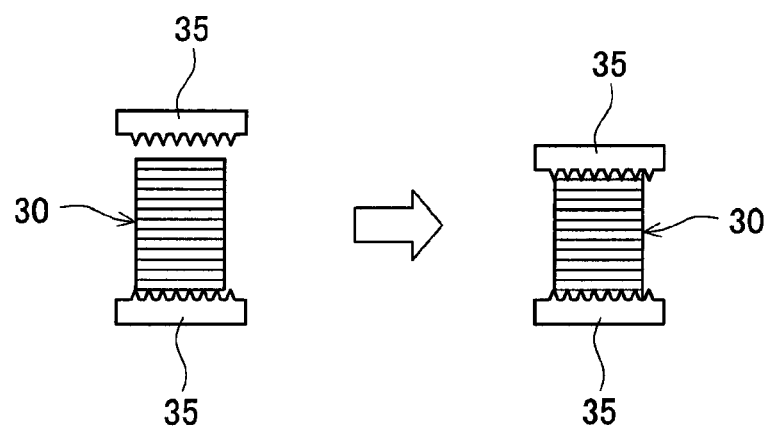
FIG. 17 is a view showing a state where the dimple process is performed in the re-press.

Accordingly, it is preferable to incorporate the dimple process to the manufacturing step of the core member 30. That is, the core member 30 is configured by stacking the electromagnetic steel sheets 21b. Then, to increase the caulking force between the stacked steel sheets, the stacked steel sheets are ordinarily pressed again after they are stacked. As shown in FIG. 17, in the re-press step after the stacking, the re-press is performed using a pair of dimple process jigs 35 each having a projection. Since the coil end faces 30a are uniformly pressed by performing the dimple process as described above, the deformation of the core member 30 which may be generated by the dimple process can be reliably prevented. Further, since the dimple process step is incorporated to the re-press step, it is not necessary to newly provide the dimple process step. Note that FIG. 17 is a view showing the state that the dimple process is performed in the re-press.

As described above in detail, according to the stator member according to the second embodiment, since the recesses 31 are formed on both the coil end faces 30a by the dimple process, the slip of the insulator 60 in the coil end faces 30a can be prevented by the large anchor effect caused by the irregularities of the recesses 31. This can prevent the insulator 60 from being deformed and avoid the stress acting on the insulator 60 from concentrating on the corners of the teeth portion 25. This configuration can reliably prevent the generation of cracks in the insulator 60 and hence reliably prevent a short-circuit between the core member 30 and the edgewise coil 70.

Further, unlike the first embodiment, the metal amount in the split stator core is not reduced, so that the electromagnetic performance of the stator member is not deteriorated.

Then, the dimple process can be performed on the coil end faces 30a without lowering the production efficiency and without increasing the production cost by incorporating the dimple process step to the re-press step performed after the electromagnetic steel sheets 21b are stacked. Accordingly, the stator member having the high insulation reliability can be manufactured also in the second embodiment without lowering the production efficiency and without increasing the production cost.

Third Embodiment

Next, a third embodiment will be described. In the third embodiment, adhesive layers are provided on coil end faces as the slip prevention mechanism in place of the bottomed holes 26 of the first embodiment. Accordingly, a structure and a manufacturing method of a split stator member are somewhat different from those of the first embodiment. Thus, a point different from the first embodiment will be mainly described below. Note that the configurations common to those of the first embodiment are denoted by the same reference numerals in the drawings and the description of the configurations is appropriately omitted.

Figure 18:
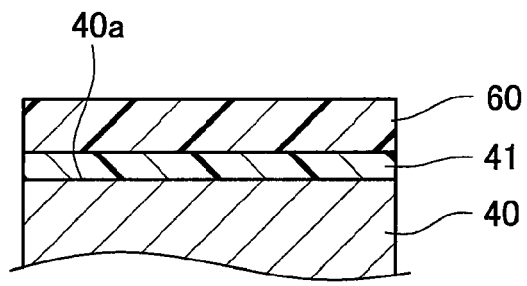
FIG. 18 is a sectional view showing a split stator member of a third embodiment and is an enlarged sectional view showing a coil end face and its surrounding.

First, a split stator member according to the third embodiment will be described with reference to FIG. 18. FIG. 18 is a sectional view showing the stator member according to the third embodiment and is an enlarged sectional view showing a coil end face and its surroundings.

As shown in FIG. 18, in the stator member in the third embodiment, an adhesive layer 41 is provided on a coil end face 40a in a teeth portion of a split stator core member 40. With this configuration, the adhesion force of the adhesive layer 41 causes an insulator 60 to be in close contact with and fixed firmly onto the coil end face 40a. Note that the core member 40 is configured by stacking the electromagnetic steel sheets 21b as shown in FIG. 8.

The adhesive layer 41 may be made of a high thermal conductive adhesive, for example, a non-metal high thermal conductive filler containing epoxy resin. With this configuration, the heat radiation property of the core member 40 is prevented from being disturbed by the adhesive layer 41. Note that, in this embodiment, glass is used as the non-metal high thermal conductive filler.

Note that the adhesive layer 41 may have a thickness of about 10 to 50 µm. When the adhesive layer 41 is thinner than 10 µm, the slip of the insulator 60 cannot be effectively prevented by the adhesive layer 41, whereas when the adhesive layer 41 is thicker than 50 µm, there is a possibility that the heat radiation property of the core member 40 is disturbed.

Figure 19:
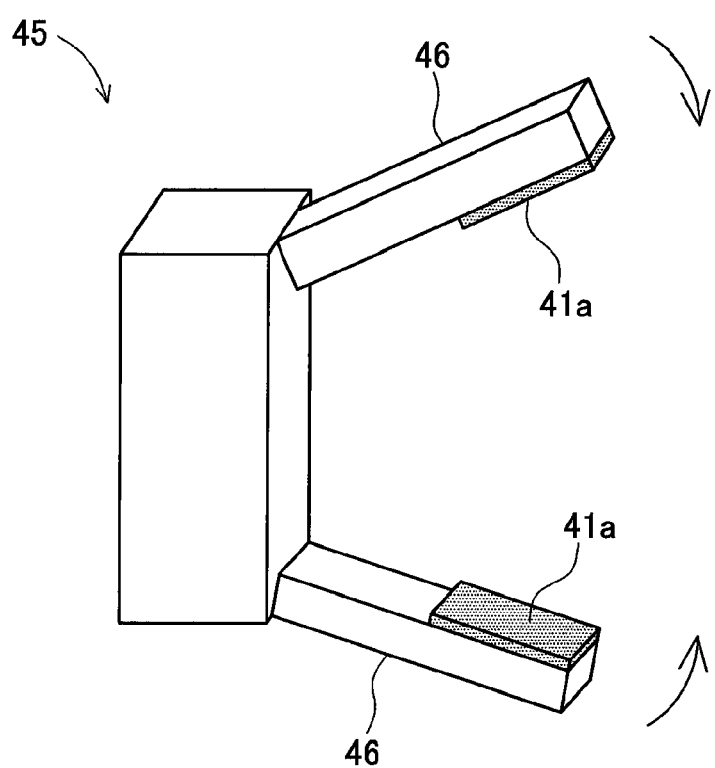
FIG. 19 is a perspective view showing a schematic configuration of a transport unit for transporting a split stator core member.

Next, the manufacturing method of the stator member according to the third embodiment will be described with reference to FIG. 19 in addition to the drawings described above. FIG. 19 is a perspective view showing a schematic configuration of a transport unit for transporting the core member.

First, the electromagnetic steel sheets 21b molded in the teeth unit by press punching are manufactured. Then, the electromagnetic steel sheets 21b are stacked, forming the core member 40. Note that, also in this embodiment, the production efficiency is improved by configuring the core member 40 by punching the electromagnetic steel sheets 21b and sequentially stacking the punched electromagnetic steel sheets.

Subsequently, the adhesive layers 41 are formed by coating an adhesive onto both the coil end faces 40a of the core member 40. The adhesive layers 41 are formed by a transport unit 45 as shown in FIG. 19, which is used for transporting the core member 40 to a molding metal mold of the insulator 60.

Here, the transport unit 45 will be briefly described. The transport unit 45 has two grip arms 46 for gripping the core member 40. The grip arms 46 can be filled with the adhesive 41a therein, and a large number of ejection holes are formed on the grip surfaces (contact surfaces with the coil end faces 40a). With this configuration, the transport unit 45 can eject the adhesive 41a onto the grip surfaces of the grip arms 46 in a predetermined thickness and in a predetermined amount immediately before the core member 40 is transported.

Then, the transport unit 45 is used to grip the core member 40 in the state that the adhesive 41a is ejected onto the grip surfaces of the grip arms 46 as shown in FIG. 19 in the predetermined thickness and in the predetermined amount, and transport the core member 40 to the molding metal mold of the insulator 60. At this time, the adhesive 41a is coated onto both the coil end faces 40a of the core member 40 set in the molding metal mold by the grip arms 46, and the adhesive 41a becomes the adhesive layers 41.

Thereafter, the stator member is completed by insert molding the insulator 60 to the core member 40 to which the adhesive layers 41 are formed and attaching the edgewise coil 70 likewise the first embodiment (refer to FIG. 1). Note that the insulator 60 is molded before the adhesive layers 41 are cured.

Then, in the stator member according to the third embodiment manufactured as described above, as shown in FIG. 18, the insulator 60 is resin molded on the coil end face 40a via the adhesive layer 41. Therefore, the insulator 60 can be firmly fixed to the coil end faces 40a by the adhesion force of the adhesive layer 41. With this configuration, according to the stator member of the third embodiment, it is possible to prevent slipping of the insulator 60 caused by the thermal expansion-contraction under the usage environment on the coil end faces 40a of the core member 40. Further, the slip of the insulator 60 on the coil side surfaces can also be prevented as done in the first embodiment. Accordingly, the insulator 60 is prevented from being deformed and the stress acting on the insulator 60 can be reliably avoided from concentrating on the corners of the teeth portion in the core member 40. As a result, in the stator member of the third embodiment, there is no possibility that cracks are generated in the insulator 60, and hence a short-circuit between the core member 40 and the edgewise coil 70 is reliably prevented.

As described above in detail, according to the stator member of the third embodiment, the adhesive layers 41 are formed on both the coil end faces 40a. Therefore, the slip of the insulator 60 on the coil end faces 40a can be prevented by the action of the adhesive layers 41. Accordingly, the insulator 60 is prevented from being deformed, and the stress acting on the insulator 60 can be avoided from concentrating on the corners of the teeth portion in the core member 40. This configuration can reliably prevent the generation of cracks in the insulator 60 and hence also reliably prevent the short-circuit between the core member 40 and the edgewise coil 70.

Further, unlike the first embodiment, since the metal amount in the core member is not reduced, the electromagnetic performance of the stator member is not deteriorated.

Then, since the adhesive layers 41 are formed when the core member 40 is transported to the molding metal mold for molding the insulator 60, the adhesive layers 41 can be provided on the coil end faces 40a without lowering the production efficiency and without increasing the production cost. Accordingly, the stator member having the high insulation reliability can be manufactured also in the third embodiment without lowering the production efficiency and without increasing the production cost.

Fourth Embodiment

Finally, a fourth embodiment will be described. In the fourth embodiment, rough surface regions formed by a shot blast process are provided on coil end faces as the slip prevention mechanism in place of the bottomed holes 26 of the first embodiment. Accordingly, a structure and a manufacturing method of a split stator member are partially different from those of the first embodiment. Thus, a point different from the first embodiment will be mainly described below. Note that the configurations common to those of the first embodiment are denoted by the same reference numerals in the drawings and the description of the configurations is appropriately omitted.

Figure 20:
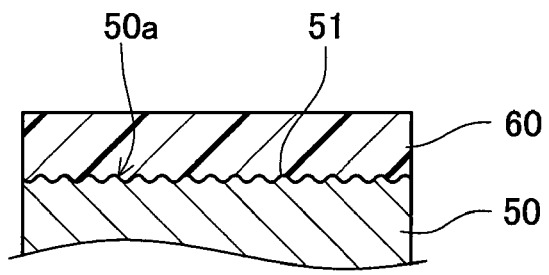
FIG. 20 is a sectional view showing a part of a split stator member of a fourth embodiment and is an enlarged sectional view showing a rough surface region on a coil end face and its surroundings.
Figure 21:
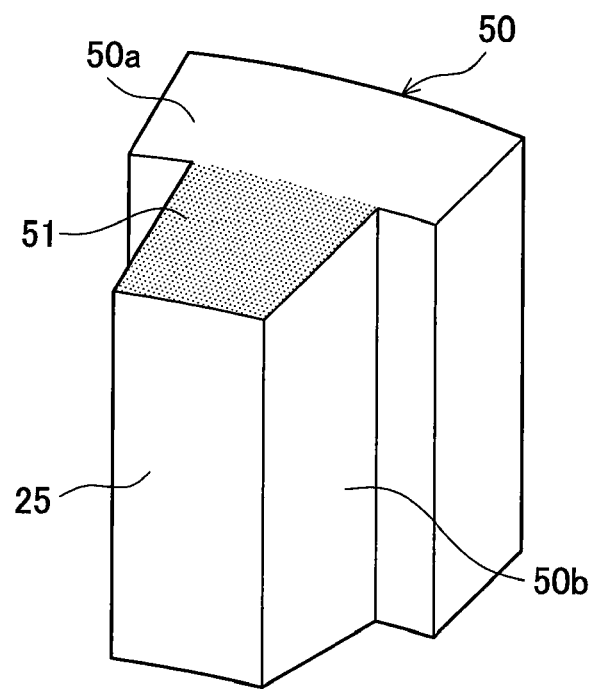
FIG. 21 is a perspective view showing a schematic configuration of a split stator core member.

First, the split stator member according to the fourth embodiment will be described with reference to FIGS. 20 and 21. FIG. 20 is a sectional view showing a part of the stator member according to the fourth embodiment and is an enlarged sectional view showing the rough surface region formed on a coil end face and its surroundings. FIG. 21 is a perspective view showing a schematic configuration of a split stator core member.

As shown in FIG. 20, in the stator member of the fourth embodiment, a rough surface region 51 whose surface is roughed and to which irregularities are formed is formed on a coil end face 50a in a teeth portion 25 of a split stator core member 50. The rough surface region 51 is formed by a shot blast process. Note that the core member 50 is configured by stacking the electromagnetic steel sheets 21b shown in FIG. 8.

Then, as shown in FIG. 21, the rough surface regions 51 are provided in the part defining a teeth portion 25 (corresponding to a part where an insulator 60 is formed) in both the coil end faces 50a of the core member 50. This configuration can improve the degree of adhesion of the insulator 60 on the coil end faces 50a. Note that no problem occurs even if the rough surface regions 51 are extended to portions other than the teeth portion of the coil end faces 50a.

Figure 22:
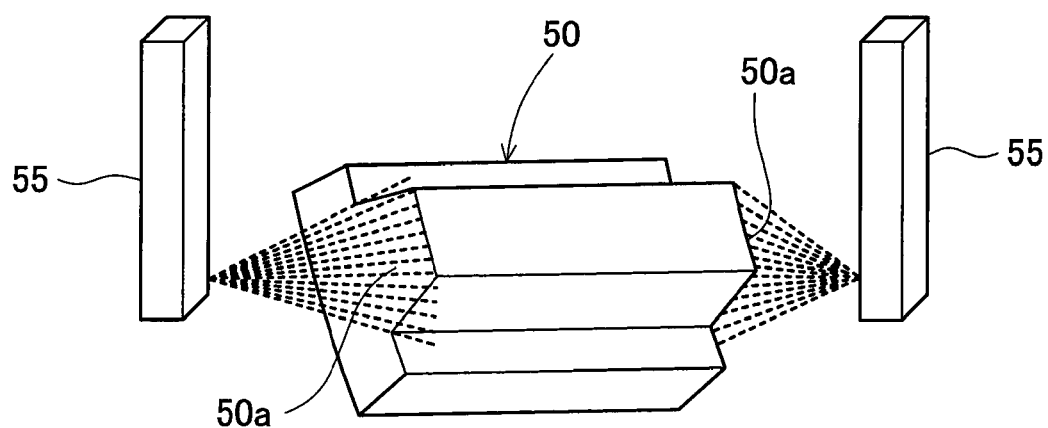
FIG. 22 is a view showing a state where a shot blast process is performed.

Next, a manufacturing method of the stator member according to the fourth embodiment will be described with reference to FIG. 22 in addition to the drawings described above. FIG. 22 is a view showing the state that the shot blast process is performed.

First, the electromagnetic steel sheets 21b molded in the teeth unit by press punching are manufactured. Then, the core member 50 is configured by stacking the electromagnetic steel sheets 21b. Note that, also in this embodiment, the production efficiency is improved by configuring the core member 50 by punching the electromagnetic steel sheets 21b and sequentially stacking the punched electromagnetic steel sheets.

Subsequently, as shown in FIG. 22, the shot blast process is carried out by projecting a non-metal projection material from blast devices 55 to the parts corresponding to the teeth portion in both the coil end faces 50a of the core member 50. Here, a non-metal high thermal conductive filler may be used as the projection material. In this embodiment, glass is used. With this configuration, even if the projection material is adhered to the core member 50, the insulation capability is not lowered and the heat radiation property of the core member 50 can be improved by the adhered projection material. Then, the core member 50, in which the rough surface regions 51 are formed on both the coil end faces 50a is completed by the shot blast process as shown in FIG. 21.

Thereafter, the stator member is completed by insert molding the insulator 60 to the core member 50 to which the rough surface regions 51 are formed and attaching an edgewise coil 70 likewise the first embodiment (refer to FIG. 1).

Then, in the stator member of the fourth embodiment manufactured as described above, a part of the resin molded insulator 60 enters the concave portions of the rough surface regions 51 on the coil end faces 50a as shown in FIG. 20. Therefore, the degree of adhesion of the insulator 60 can be improved in the rough surface regions 51. With this configuration, according to the stator member of the fourth embodiment, it is possible to prevent slip of the insulator 60 caused by the thermal expansion-contraction under the usage environment on the coil end faces 50a of the core member 50. Further, the slip of the insulator 60 on the coil side surfaces 50b can be prevented as done in the first embodiment. This can prevent the insulator 60 from being deformed and avoid the stress acting on the insulator 60 from concentrating on the corners of the teeth portion 25. As a result, in the stator member according to the fourth embodiment, since there is no possibility that cracks are generated in the insulator 60, a short-circuit between the core member 50 and an edgewise coil 70 is reliably prevented.

As described above in detail, according to the stator member of the fourth embodiment, since the rough surface regions 51 are formed on both the coil end faces 50a by the shot blast process, the slip of the insulator 60 on the coil end faces 50a can be prevented. Accordingly, the insulator 60 is prevented from being deformed and the stress acting on the insulator 60 can be avoided from concentrating on the corners of the teeth portion 25. This configuration can reliably prevent the generation of cracks in the insulator 60 and hence also reliably prevent the short-circuit between the core member 50 and the edgewise coil 70.

Further, unlike the first embodiment, since the metal amount in the core member is not reduced, the electromagnetic performance of the stator member is not deteriorated.

Further, since the non-metal high thermal conductive filler (for example, glass) is used as the projection material of the shot blast, even if the projection material is adhered to the core member 50, the insulation capability is not lowered, and the heat radiation property of the core member 50 can be improved by the adhered projection material.

Note that the embodiments described above are only examples and by no means restrict the invention, and it is needless to say that the embodiments can be variously improved and modified within the gist of the invention. For example, the respective embodiments can be arbitrarily combined. For example, both the bottomed holes and the recesses by the dimple process may be provided on the coil end faces by combining the first and the second embodiments. Otherwise, both the bottomed holes and the rough surface regions formed by the shot blast process may be provided on the coil end faces by combining the first and the fourth embodiments. With this configuration, since a larger anchor effect can be obtained, the slip of the insulator 60 can be more effectively prevented.

Further, although the embodiments are exemplified as to the case that the present invention is applied to the stator member divided in the teeth unit, the invention is not restricted to this case and can be applied also to a stator member having two or more teeth portions.

Further, in the embodiments described above, although the edgewise coil 70 is exemplified as the molded coil provided for the stator member, the coil attached to the stator member is not limited to the edgewise coil 70, and other kinds of coil, such as the coil having a round or square cross section, may be employed as long as the coil is molded and has a fixed shape.

DESCRIPTION OF THE REFERENCE SIGNS

10 Split stator member
20 Split stator core member
20a Coil end face
20b Coil side surface
21 Electromagnetic steel plate
22 Through hole
25 Teeth portion
26 Bottomed hole
30 Split stator core member
30a Coil end face
30b Coil side surface
31 Recess
31a Concave portion
31b Convex portion
33 Projection
34 Roller
35 Dimple process jig
40 Split stator core member
40a Coil end face
41 Adhesive layer
45 Transport unit
46 Grip arm
50 Split stator core member
50a Coil end face
50b Coil side surface
51 Rough surface region
55 Blast device
60 Insulator
60a Cover portion
60b Cylindrical portion
60c Projection

The invention claimed is:

1. A split stator including an insulator molded integrally with a split stator core made of stacked electromagnetic steel sheets, the split stator comprising:
a slip prevention mechanism for preventing slip of the insulator, the slip prevention mechanism being provided on coil end faces of the split stator core,
wherein the slip prevention mechanism is made of bottomed holes formed in the coil end faces, and
the bottomed holes are arranged one in each of at least four corners of a teeth portion of the split stator core.

2. The split stator according to claim 1, wherein the bottomed holes arranged at the four corners are placed within 5 mm from edges of each coil end face of the teeth portion.

3. The split stator according to claim 1, wherein each bottomed hole includes a large diameter portion having a diameter larger than a diameter of the hole on the coil end faces.

4. The split stator according to claim 1, wherein the bottomed holes are formed of through holes previously provided in the electromagnetic steel sheets.

5. The split stator according to claim 1, wherein the slip prevention mechanism includes recesses formed by a dimple process to the coil end faces.

6. The split stator according to claim 1, wherein the slip prevention mechanism includes rough surface regions formed by a shot blast process using a non-metal high thermal conductive filler to the coil end faces.

7. A manufacturing method of a split stator including an insulator molded integrally with a split stator core made of stacked electromagnetic steel sheets, the method comprising:
providing bottomed holes as a slip prevention mechanism for preventing slip of the insulator on a coil end face of the split stator core by stacking electromagnetic steel sheets formed with through holes and electromagnetic steel sheets formed with no through holes in press molding of the electromagnetic steel sheets, the bottomed holes being arranged one in each of at least four corners of a teeth portion of the split stator core; and
integrally molding the insulator with the split stator core by insert molding.

8. The manufacturing method of the split stator according to claim 7, the method including:
the bottomed holes arranged at the four corners are placed within 5 mm from edges of each coil end face of the teeth portion.

9. The manufacturing method of the split stator according to claim 7, the method including:
forming a large diameter portion in each bottomed hole by changing the diameter of the through holes to be formed in the electromagnetic steel sheets, the large diameter portion having a diameter larger than that of the holes on the coil end faces.

10. The manufacturing method of the split stator according to claim 7, the method including performing a dimple process to the coil end faces to form a recess as the slip prevention mechanism.

11. The manufacturing method of the split stator according to claim 7, the method including performing a shot blast process using high thermal conductive filler to the coil end faces to form rough surface regions as the slip prevention mechanism.

* * * * *